United States Patent [19]
Channell et al.

[11] 3,709,431
[45] Jan. 9, 1973

[54] ZONE CONTROL VALVES

[75] Inventors: Andrew Willis Channell; Satoru Shikasho, both of Chicago; Gilbert Robert Sommer, Freeport, all of Ill.

[73] Assignee: International Telephone and Telegraph Corporation, New York, N.Y.

[22] Filed: Oct. 31, 1969

[21] Appl. No.: 872,875

[52] U.S. Cl. ............236/68 R, 251/11, 251/335 B
[51] Int. Cl. ........................................F16k 31/00
[58] Field of Search ............236/68 R, 99, 100, 101; 251/335 B, 331, 11

[56] References Cited

UNITED STATES PATENTS

| | | | |
|---|---|---|---|
| 2,597,787 | 5/1952 | Garner et al. | 236/99 UX |
| 2,743,738 | 5/1956 | Johnson | 251/335 B |
| 2,893,413 | 7/1959 | Nordahl | 236/99 UX |
| 1,751,688 | 3/1930 | Eggleston | 236/99 |
| 2,271,307 | 1/1942 | Ray | 251/11 X |
| 2,548,878 | 4/1951 | Dillman | 236/99 |
| 2,631,598 | 3/1953 | Dillman et al. | 236/68 X |
| 3,140,852 | 7/1964 | Herzog | 236/68 X |
| 3,169,008 | 2/1965 | Whitlock | 236/68 UX |
| 3,326,510 | 6/1967 | Kolze | 236/68 UX |
| 3,381,701 | 5/1968 | Sherwood et al. | 236/68 X |
| 3,399,695 | 9/1968 | Stehlin | 251/331 X |
| 3,472,478 | 10/1969 | Sherwood | 236/68 X |

Primary Examiner—William F. O'Dea
Assistant Examiner—P. D. Ferguson
Attorney—C. Cornell Remsen, Jr., Walter J. Baum, Percy P. Lantzy, J. Warren Whitesel, Delbert P. Warner and James B. Raden

[57] ABSTRACT

The invention is concerned with zone control valves of the type employed in hydronic temperature control systems. The valve incorporates a molded elastomeric bellows and sealing means for controlling temperature determining fluid flow. The valve can be constructed by simplified manufacturing techniques and can be maintained more readily in the field, thus providing substantial cost advantages.

6 Claims, 3 Drawing Figures

ZONE CONTROL VALVES

This invention relates to hydronic temperature control systems. More particularly, it relates to zone control valves for use in such systems.

A zone control valve is a device which regulates the flow of fluids or liquids, which may be either heated or cooled, as a function of the temperature sensed by an associated thermostatic sensor. The valve opens or closes to control the flow volume, in direct relationship to the temperature ambient to the associated thermostatic sensor.

Present day hydronic temperature control systems utilize these zone control valves to regulate the flow of heated or cooled fluid through the coils of heat exchangers which are employed for either heating or cooling specified areas or zones. Because of the regulatory effect of the zone control valves, the temperatures of the zones served by the exchangers are effectively controlled.

The zone valves are often constructed as a combination of a heat expansible motor assembly which actuates a piston extending through a wall seal to a valve. As the electrically associated thermostatic sensor senses the temperature in the area, it causes the heat expansible motor assembly to operate, if necessary, and the motor causes the valve stem or rod to move, thus adjusting the position of the valve. An important consideration in this construction is the static pressure seal or boot surrounding the valve stem or rod. It must be capable of resisting wear and providing long and trouble free life. Additionally, the seal or boot must be extremely elastic and must not be too costly to manufacture or install.

In known zone valves of the type described, it has been commonplace to use a number of different devices such as diaphragms, metal bellows and the like for sealing the wall port where the actuating rod moves through the wall to translate the motion of the motor to the valve. However, problems have been encountered with the sealing devices employed heretofore. For example, the diaphragms have tended to experience mechanical fatigue responsive to actuation of the valve assembly, thus causing relatively short life spans therefor which cause distinct economic and maintenance problems. The use of metal bellows, which entails considerable tooling and raw material expense, has tended to cost more than is desirable considering the total value of the entire valve assembly. The metal bellows also tends to encounter mechanical fatigue problems. In addition, the metal bellows has required unique treatment for sealing metal to metal such as the installation of gaskets, O-rings, cement and the like. Furthermore, the requirements for sealing the diaphragm or metal bellows to the wall of the valve have introduced a number of assembly and maintenance problems, thus, increasing the cost of manufacture and the cost of maintaining the unit.

Accordingly, an object of this invention is to provide new and improved zone control valves. In this connection, an object is to provide zone valves having new and improved sealing assemblies between the heat motor and the valve unit. Another object of the invention is to provide sealing units for these valves which have extremely long life, and do not experience mechanical fatigue problems, to the extent of diaphragms and metal bellows. Yet another object of the invention is to provide auxiliary mechanical controls for the valves which can be adjusted to override any sensing unit.

Yet another object of the invention is to provide zone control valves having parts made from the newer, less costly, more easily manufactured materials hitherto considered unsuitable for this use.

In greater detail, an object is to provide an elastomeric bellows for static pressure sealing in zone control valves. The elastomeric bellows may be molded on low-cost general purpose tools, whereas, for example, the hitherto employed metal bellows arrangements have required high cost precision tooling.

The above mentioned and other features and objects of this invention and the manner of obtaining them will become more apparent, and the invention itself will be best understood by reference to the following description of an embodiment of the invention taken in conjunction with the accompanying drawings, in which.

Figure 1:
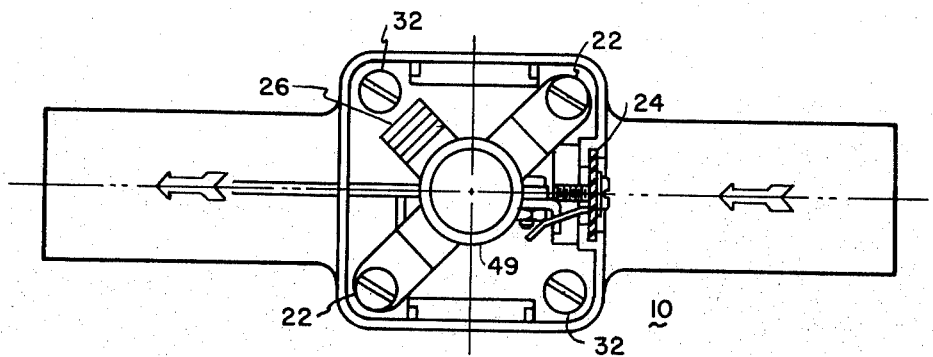
FIG. 1 is a top cross-sectional view of the inventive zone control valve assembly.
Figure 2:
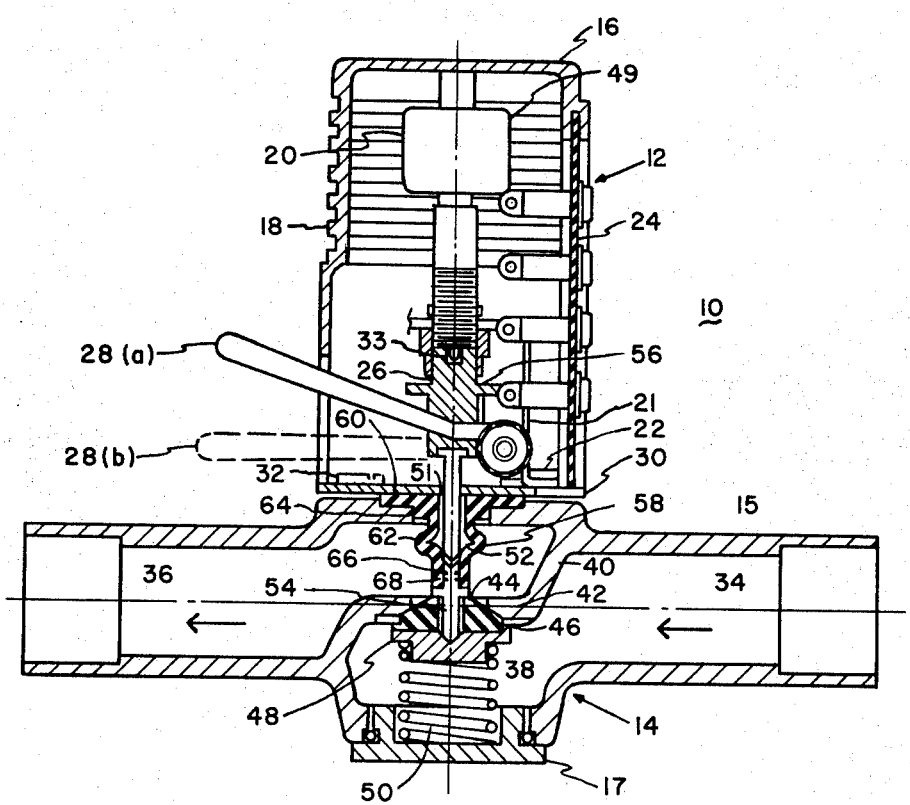
FIG. 2 is a cross-sectional view of the valve assembly taken along line A—A, in FIG. 1.

FIGS. 1 and 2 show cross-sectional views of a zone control valve assembly 10 manufactured in accordance with the teachings of this invention. More particularly, the major units of this valve assembly 10 can be considered in two parts, that is, an operator unit 12 and a valve unit 14. The operator unit 12 positions the valve responsive to ambient conditions sensed by a remote temperature sensor. The valve unit 14 comprises a poppet valve assembly including a valve body, inlet and outlet ports and a valve sealing means.

The operator unit 12 is protected from dirt and dust by cover 16. The operator illustrated herein is of the heat motor actuator type including a casing 18, a heat motor assembly 20 mounted on U-shaped bracket 21 by two screws 22, a terminal strip 24, a coupler and switch actuator assembly 26, an operator handle 28 and a base plate 30 which is detachably connected to the valve unit 14 by screws 22 and 32. A piston 33 extends from the lower end of the heat motor assembly 20 and is shown in FIG. 2 in a retracted position.

The valve unit 14, which is defined by a valve body 15 having an access cap 17, includes an inlet or port 34 and an outlet or port 36, a passageway 38 communicating the inlet 34 and the outlet 36 and a bulk head 40 separating the inlet 34 and the outlet 36. A valve seat area 42, having a valve opening 44, pierces the bulk head 40. Seated in the opening 44 of the valve seat area 42 is a conical, self-aligning seat disc 46 preferably constructed of an elastomeric material. Adjacent seat disc 46 is a seat disc retainer 48 attachably connected to seat disc 46 in a manner such that when the disc retainer 48 moves in a vertical direction, the seat disc 46 moves correspondingly and in proper alignment. One end of spring 50 engages the disc retainer 48 and the other end engages the inside bottom of valve body 15 at the access cap 17.

Directly above the valve seat area 42 is an actuator hole or wall port 51 in the valve body 15 through which an actuator rod 52 must operate. The actuator rod 52 passes through the actuator hole 51 and is in point contact with valve stem 54. Valve stem 54 passes through valve seat area 42 at a central position of the valve seat disc 46 making point contact with the valve disc retainer 48.

In greater detail, the heat motor assembly 20 may be any heat expansible motor including a high pressure casing, a heater unit 49, a heat expansible material such as parafin, solid wax and the like, a container to hold the expansible material and a piston rod 33. The piston rod 33 is actuated by the expansible material being heated by the heater unit 49, the the heating being controlled by the switch mechanism of the coupler and switch actuator assembly 26.

The terminal strip 24 may be constructed from any known non-conductive material and contains contact points for terminal switch connections allowing connection of the operator unit 12 to a source of electrical current to provide electrical current for heating the heater unit 49. The coupler and switch actuator assembly 26 abuts the heat motor assembly 20 and is engaged by the piston rod 33 of the assembly. The assembly 26 includes coupler flange 56 which is positioned to engage the operator handle 28 to make or break electrical contact for the operator unit 12, and more particularly for the heat motor assembly 20.

The operator handle 28 can be positioned for automatic operation 28(a) responsive to ambient conditions sensed by a remote temperature sensor or it can be positioned for mannual operation 28(b). If it is desired to operate the valve unit 14 manually, or if a power failure necessitates such operation, it is not necessary to remove any parts or to make any complicated adjustments of the equipment. The operator handle 28 which extends externally from the operator unit casing is merely moved into the manual position 28(b) thus overriding the operator unit 12. The valve seat disc 46 and the seat disc retainer 48 are thereby moved away from valve opening 44 allowing fluid to flow. In such case, to stop fluid flow, the operator handle 28 is returned to the original automatic position 28(a).

The valve unit 14 is of globe type design. The inlet 34 of valve unit 14 is connected to a supply pipe-line providing either hot or cold fluid. The outlet 36 is connected to a pipe line leading to the fan coils or other heat exchanging means located in the temperature controlled zone. The valve seat disc 46 is constructed of long-wearing, water and corrosion resistant elastomeric material providing a self-aligning, resilient, renewable pressure seal surrounding the valve stem 54. The seat disc retainer 48 engages the seat disc 46 and is, in turn, engaged by return or closure spring 50 which is compressed between the disc retainer 48 and the access cap 17. Thus, the spring 50 acts to return the valve disc retainer 48 and the valve seat disc 46 to the closed position and, consequently the packless valve stem 54 and the actuator rod 52 to their point of origin when the expansible material in the heat motor assembly cools and contracts.

A feature to be noted is the construction of the valve stem 54 and the actuator rod 52. The point contact between stem 54 and rod 52 acts as a toggle mechanism, thus providing means for correcting any possible misalignment that may occur therebetween.

It is also to be noted that by unscrewing screws 22 which connect casing 18 and base plate 30 of operator unit 12 to the valve unit 14, the heat motor assembly 20, coupler and switch actuator assembly 26 and terminal strip 24 can be removed easily from the valve unit 14 without draining the fluid from the valve system as has been necessary heretofore. Thus, maintenance of the operator unit 12 or replacement thereof is greatly facilitated.

It should be further noted that by removing access cap 17, easy access is provided for removing or repairing the valve seat disc 46, disc retainer 48 and spring 50. Again, this feature is of substantial value in maintenance of the inventive valve. Heretofore, it has been necessary to drain the fluid from the valve system and then remove the power head assembly before it was possible to gain access to these parts. This procedure was troublesome and time consuming.

In keeping with one aspect of this invention, a new and improved elastomeric bellows 58 is arranged so that flange 60 of bellows 58 seals the actuator hole 51 in the valve body 15 through which the actuator rod 52 must move. Further, the operating movement of rod 52 and stem 54 is translated to the valve seat disc 46.

More particularly, the bellows 58 is a molded unit comprising any suitable elastomeric material such as Buna-S (anionically polymerized copolymers of butadiene and styrene), Buna-N (anionically polymerized copolymers of butadiene and acrylonitrile), polybutadiene, EPT (ethylene propylene terpolymers), silicone rubbers, neoprene, neoprene chloroprene, isobutylene isoprene, chlorosulfonated polyethylene, butyl rubber, natural rubber and the like. The bellows unit 58 has an expansion joint 62 near the center thereof and the top portion of the bellows 58 is conformably molded to fit into a corresponding slot 64 in the valve body 15 in close relationship thereto. The unit 58 is sealed into place in the slot 64 by the compressive action of base plate 30 detachably connected to valve body 15 by screws 22 and 32. Annular rings or slots 66 are formed in the valve stem 54 and the bellows unit 58 is molded directly onto this valve stem 54 in order to provide secure interlocking of the lower portion of unit 58 to the valve stem 54 by means of projections 68 which are formed during this molding operation. Thus, a close, water-tight fitting is provided.

The expansion joint 62 is herein depicted as a single accordian fold or convolution although it may comprise a multiplicity of such folds or convolutions. This joint 62 enables the valve stem 54 to move through discrete distances suitable for completely opening or closing the poppet valve responsive to the motive force exerted by the heat motor assembly 20.

It will be appreciated that an advantage of the bellows arrangement of the instant valve assembly is that it can be readily manufactured by molding with low-cost general purpose tools without necessitating high cost precision tooling. Furthermore, this bellows arrangement is low-cost, wear resistant, non-corrosive and highly resistant to attack of fluids.

Figure 3:
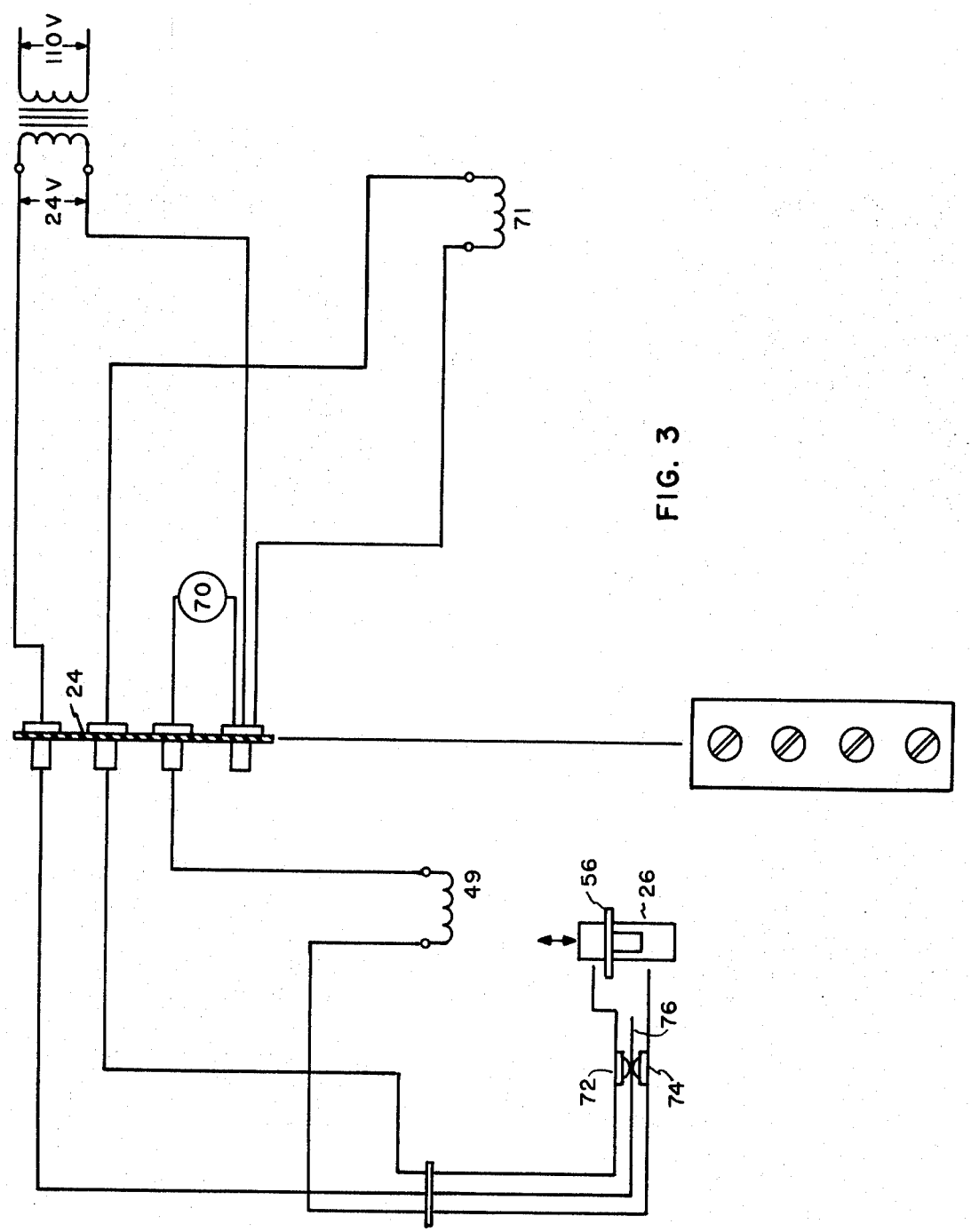
FIG. 3 is a schematic diagram of the electrical connections in a hydronic temperature control system employing the valve assembly of FIG. 1.

From the foregoing, the operation of the inventive zone control valve should be apparent to those skilled in the art. In greater detail, the valve assembly 10 may be mounted in a hydronic system in a manner such that the inlet 34 and the outlet 36 ports of the valve assembly 10 are connected to pipe lines leading to fan coils or other heat exchanging means located in the temperature controlled zone. A thermostat 70 is positioned in the temperature controlled zone to control operation of the valve assembly 10 as a function of the temperature in the zone. When the thermostat 70 calls for either heating or cooling, low voltage power (e.g., 24 volts as shown in FIG. 3) is applied to the heater unit 49 of heat motor assembly 20 thus heating the heat expansible material therein. When the heat motor 20 reaches operating temperature, the heat expansible material expands and exerts pressure on piston 33 forcing the piston 33 to move downwardly engaging the coupler and switch actuator assembly 26. As the actuator assembly 26 is pushed downwardly by piston 33, it causes actuator rod 52 to push downwardly on valve stem 54. Thereby, valve stem 54 is pushed downwardly, and bellows 58 accordingly is caused to elongate. The downward motion of valve stem 54 which is in point contact with disc retainer 48 causes disc retainer 48 to move downwardly against the action of spring 50. Consequently, valve seat disc 46, which is retainably engaged by disc retainer 48, moves away from the valve opening 44 of valve seat area 42 thereby opening the valve to flow of temperature determining fluid through the system.

As shown in FIG. 3, the initial flow of current from thermostat 70 to heat motor assembly 20 also causes activation of pump relay switch 71 which causes a pump to start pumping the temperature determining fluid through the valve system. However, use of pump relay switch 71 is optional and any suitable means may be employed for starting the pump.

When the valve is in the closed position, the auxiliary switch contacts 72 are held open by the extended flange 56 of coupler and switch assembly 26. At the same time, the heat motor switch 74 is in the "made" or contact closed position because of the normally closed switch design. As electrical current is applied to the heating element of heater unit 49 and piston 33 of heat motor assembly 20 begins to move the coupler and switch actuator assembly 26, the coupler flange 56 moves away from a top switch blade causing it to eventually make contact with a common stationary switch blade 76, thus completing the auxiliary circuit.

As the piston 33 moves the coupler and switch actuator assembly 26 through a predetermined stroke, the coupler flange 56 engages the bottom switch blade and moves it away from the common switch blade 76. thus "breaking" the motor switch 74 and stopping the current flow into the heating element of the heater unit 49. Without power to the element, the heat motor assembly 20 cools, causing the piston 33 and assembly 26 to retract under the influence of closure or return spring 50. This reversal in movement of coupler flange 56, re-establishes the heat motor switch 74 allowing current to flow to the heating element of heater unit 49. The slight hunting action of the switch mechanism causes the valve to remain open until the setting of the external thermostat 70 or a like control is satisfied. Then, the current to the heat motor assembly 20 is cut off.

While the principles of the invention have been described above in connection with specific apparatus and applications, it is to be understood that this description is made only by way of example and not as a limitation on the scope of the invention.

We claim:

1. A control valve comprising a valve body having a fluid inlet and a fluid outlet port, means communicating said inlet and outlet ports, means for separating said inlet and outlet ports, an opening in said separating means for allowing fluid flow through said value, a self-aligning elastomeric sealing means seated in said opening in said separating means for sealing said opening in an inoperative position, operator means including actuator means which project into said valve body through an opening in the valve body, said actuator means being positioned in said valve body for dislodging said sealing means from said sealing position to allow fluid flow through said valve body from said inlet port to said outlet port responsive to temperature conditions sensed by a temperature sensing means which is operatively connected to said operator means, biasing means for returning said sealing means to the sealing position as a function of temperature sensed by said temperature sensing means, an elastomeric bellows operatively attached to said actuator means and having a flanged section which seats in and seals said opening in said valve body through which said actuator means enters said valve body whereby fluid escape from said valve body is prevented, means normally restraining said bellows in the opening in said body, said restraining means being removable to free said bellows, the connection of said operator means to said sealing means being releasable to permit removal of said bellows and actuator means through the opening in said valve body without disturbing the seating of said sealing means in sealing relation in said separating means opening, and allowing access to said sealing means through said valve body opening.

2. The control valve of claim 1 wherein said actuator means for dislodging said sealing means comprises a driver and a driven rod, said driver rod having an angled bottom tip portion which fits into a correspondingly angled groove in the end of said driven rod, said end of said driver rod being aligned in relation to said end groove in said driven rod to provide a toggle action for correcting misalignment between said rods.

3. The control valve of claim 2, wherein said driven rod is attachably connected to said bellows for providing a water-tight fitting.

4. The control valve of claim 1 including auxiliary mechanical control means for overriding said temperature sensing means to manually operate said means.

5. The control valve of claim 1 including access means for removing said sealing means and said biasing means while the operator means remains in position whereby maintenance and repair of said valve is facilitated.

6. A control valve comprising a valve body having a fluid inlet and a fluid outlet port, means communicating said inlet and outlet ports, valve means in said valve body for controlling fluid flow through said valve, operator means including actuator means which project into said valve body through an opening in the valve body for positioning said valve means responsive to temperature conditions sensed by a temperature sensing means, an elastomeric bellows operatively attached to said actuator means and having a flanged section which seats in and seals said opening in said valve body through which said actuator means enters said valve body, said elastomeric bellows operating to retain fluid within said valve body and for translating the operation of said actuator means to said valve means, means for separating said inlet and outlet ports, an opening in said separating means, a self-aligning elastomeric sealing means for providing a pressure seal in said opening in said separating means when said valve means is in the normal inoperative position, said actuator means including a driver and a driven rod which act cooperatively responsive to movement of said operator means to dislodge said sealing means from the sealing position to allow fluid flow through said valve, said driver rod having an angled tip portion which fits into a correspondingly angled groove in the end of said driven rod, said tip of said driver rod being aligned in relation to said end groove in said driven rod to provide a toggle action for correcting misalignment between said rods, said driven rod being permanently connected to said bellows and detachably engaging said sealing means for providing a water-tight fitting, biasing means for returning said sealing means to the sealing position responsive to the movement of said operator means, means permitting removal of said operator means from said valve body and for retaining said bellows sealing said valve body opening without draining said fluid from said valve body, and access means for removing and repairing said sealing means and said biasing means while the operator means remains in position.

* * * * *